(12) United States Patent
Wang et al.

(10) Patent No.: US 9,191,968 B2
(45) Date of Patent: Nov. 17, 2015

(54) MULTIPLE CHANNEL SUPPORT IN DISTRIBUTED WIRELESS SYSTEMS

(75) Inventors: Jianfeng Wang, Ossining, NY (US); Kiran S. Challapali, New City, NY (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1364 days.

(21) Appl. No.: 12/746,271

(22) PCT Filed: Dec. 5, 2008

(86) PCT No.: PCT/IB2008/055127
§ 371 (c)(1),
(2), (4) Date: Jul. 22, 2010

(87) PCT Pub. No.: WO2009/072088
PCT Pub. Date: Jun. 11, 2009

(65) Prior Publication Data
US 2010/0304772 A1    Dec. 2, 2010

Related U.S. Application Data

(60) Provisional application No. 61/012,072, filed on Dec. 7, 2007.

(51) Int. Cl.
*H04W 56/00* (2009.01)
*H04W 72/12* (2009.01)
(Continued)

(52) U.S. Cl.
CPC ........ *H04W 72/1278* (2013.01); *H04W 56/003* (2013.01); *H04W 56/0015* (2013.01); *H04W 16/14* (2013.01); *H04W 48/08* (2013.01); *H04W 88/06* (2013.01)

(58) Field of Classification Search
CPC .......................... H04W 16/14; H04W 56/0015
USPC ........... 455/452.1, 452.2, 454, 62, 63.1, 509, 455/502, 500, 67.11, 67.16; 709/226; 718/104, 105; 370/328–338, 350, 370/503–516
See application file for complete search history.

(56) References Cited

U.S. PATENT DOCUMENTS 5,923,667 A * 7/1999 Poiraud et al. ................. 370/515
6,094,429 A * 7/2000 Blanchette et al. ........... 370/347
(Continued)

FOREIGN PATENT DOCUMENTS

| WO | WO2006052221 A2 | 5/2006 |
| WO | WO2007041065 A2 | 4/2007 |
| WO | WO2007083257 A1 | 7/2007 |

OTHER PUBLICATIONS

Carlos Cordeiro et al: "C-MAC: A Cognitive MAC Protocol for Multi-Channel Wireless Networks" New Frontiers in Dynamic Spectrum Access Networks, 2007. DYSPAN 2007. 2nd IEEE International Symposium ON, IEEE, PI, Apr. 1, 2007, pp. 147-157, XP031095614.

*Primary Examiner* — John J Lee
(74) *Attorney, Agent, or Firm* — Larry Liberchuk

(57) ABSTRACT

To facilitate multi-channel communications over distributed-control radio networks, the timing of networks on multiple substantially independent channels are adjusted (350) so as to establish a common time base among the networks. With this common time base, data is transmitted concurrently (230), using the bandwidth provided by the multiple networks. To further optimize the efficiency of this technique for cognitive radio networks, the quiet period (QP) and signaling window (SW) on each network are scheduled (355) to provide overlapping quiet periods (QP) and/or overlapping signaling windows (SW). Preferably, each multi-channel user is assigned (360) the same time slot in the beacon periods (210) of the network on each channel, thereby facilitating efficient beacon transmission and reception.

20 Claims, 3 Drawing Sheets

(51) Int. Cl.
*H04W 16/14* (2009.01)
*H04W 48/08* (2009.01)
*H04W 88/06* (2009.01)

(56) References Cited

U.S. PATENT DOCUMENTS

| | | | | |
|---|---|---|---|---|
| 6,470,001 | B1* | 10/2002 | Kim et al. | 370/342 |
| 6,480,475 | B1* | 11/2002 | Modlin et al. | 370/294 |
| 7,190,683 | B2 | 3/2007 | Giallorenzi | |
| 7,978,680 | B1* | 7/2011 | Vandwalle et al. | 370/350 |
| 2002/0003786 | A1* | 1/2002 | Kim et al. | 370/335 |
| 2002/0131398 | A1* | 9/2002 | Taylor | 370/350 |
| 2003/0117991 | A1* | 6/2003 | Beyer et al. | 370/349 |
| 2004/0029591 | A1* | 2/2004 | Chapman et al. | 455/452.1 |
| 2004/0208139 | A1* | 10/2004 | Iwamura | 370/321 |
| 2005/0180314 | A1* | 8/2005 | Webster et al. | 370/208 |
| 2005/0195791 | A1* | 9/2005 | Sung et al. | 370/342 |
| 2005/0237923 | A1* | 10/2005 | Balakrishnan et al. | 370/208 |
| 2005/0237992 | A1 | 10/2005 | Mishra | |
| 2006/0045048 | A1* | 3/2006 | Kwon et al. | 370/329 |
| 2006/0176908 | A1* | 8/2006 | Kwon et al. | 370/473 |
| 2006/0215536 | A1* | 9/2006 | Mottier | 370/203 |
| 2006/0221918 | A1* | 10/2006 | Wang | 370/338 |
| 2006/0245440 | A1 | 11/2006 | Mizukoshi | |
| 2007/0072636 | A1* | 3/2007 | Worfolk et al. | 455/502 |
| 2008/0043863 | A1* | 2/2008 | Ji et al. | 375/260 |
| 2008/0090581 | A1* | 4/2008 | Hu | 455/452.1 |
| 2008/0219286 | A1* | 9/2008 | Ji et al. | 370/445 |
| 2008/0268886 | A1* | 10/2008 | Sim et al. | 455/500 |
| 2009/0041003 | A1* | 2/2009 | Challapali et al. | 370/350 |
| 2009/0092154 | A1* | 4/2009 | Malik et al. | 370/480 |
| 2009/0274140 | A1* | 11/2009 | Cordeiro et al. | 370/350 |
| 2010/0020732 | A1* | 1/2010 | Gaddam et al. | 370/310 |
| 2010/0046450 | A1* | 2/2010 | Seyedi-Esfahani et al. | 370/329 |
| 2010/0165913 | A1* | 7/2010 | Ang et al. | 370/328 |
| 2010/0226358 | A1* | 9/2010 | Cordeiro | 370/350 |

* cited by examiner

MULTIPLE CHANNEL SUPPORT IN DISTRIBUTED WIRELESS SYSTEMS

A claim of priority under 35 U.S.C. §119(e) is made to U.S. Provisional Patent Application No. 61/012,072, filed on Dec. 7, 2007.

This invention relates to the field of cognitive radio communications, and in particular to a method and system for coordinating and maintaining efficient multichannel communications in distributed wireless networks.

Cognitive radio is a communication scheme in which a device monitors licensed channels for activity, and establishes communications only on an inactive channel. It is a particularly viable solution for providing unused communications bandwidth to local area communication networks, such as allowing home networks to operate on unused television broadcast channels. Such home networks are commonly used to allow devices and appliances within a household to communicate and interact with each other, generally under a user's direct or pre-programmed command. Such communications may range from a user command to preheat an oven, to the exchange of audio/visual information among cameras, recorders, displays, and the like. Additionally, cognitive radio is particularly well suited for providing wireless broadband access in rural and remote areas, with performance comparable to DSL and cable modems.

The invention addresses devices and networks that are dynamically re-locatable among a variety of possible channels. In a typical embodiment, the possible channels are channels that are generally allocated or licensed to primary users, such as television broadcasters, but the actual occupancy of each channel varies. For example, due to the likelihood of interference, the allocation of television channels to broadcasters in a given area is restricted to every-other channel, leaving half of the channels in the available spectrum empty. In other environments, the occupancy of a channel by a primary user varies with time. Dynamically re-locatable networks can take advantage of the inefficiently utilized spectrum by establishing themselves on unused channels.

Different types of secondary users will have different bandwidth requirements and consequently, different bandwidth capabilities. Audio-video devices, for example, will have substantially greater capabilities than, for example, and audio-only device. In like manner, different Internet subscribers to a broadband system will have different requirements, and will subscribe to different classes of service. Each unused television channel can be expected to provide 6-8 MHz of bandwidth, which will support a reliable bitrate of about 20 Mbits/s. To achieve higher bitrates, 'channel bonding' can be used to allow devices to use multiple channels.

As technologies advance, the number of devices with communications capabilities can be expected to increase exponentially, and, correspondingly, the number of devices that will be configured to act as secondary users on licensed/controlled channels will also increase. Although each of these secondary user devices will be configured to avoid transmitting on channels that are occupied by primary users, some devices may be in a 'fringe' area of a primary user's broadcast, or in an interior room with poor reception of external broadcasts, and may not recognize the primary user's presence. As such, this secondary user may transmit on the channel, and this transmission may overwhelm recognition of the primary user's presence at other secondary devices in proximity to this secondary user. As each of these other secondary devices transmits on this channel, recognition of the primary user's presence at further secondary devices will be adversely affected. Therefore, to assure that primary users will be recognized, there must be certain times when all of the secondary devices on a channel are silent, to avoid this cascading interference effect and allow detection of the primary user's presence.

If a secondary device is operating on multiple channels to obtain a larger bandwidth, it will be required to observe the quiet period on each of these channels, which could substantially limit the device's achievable throughput.

Channel bonding and quiet period coordination is reasonably easy to implement on a network that operates under centralized control, such as the aforementioned broadband access network. U.S. Pat. No. 7,190,683, issued 13 Mar. 2007 to Giallorenzi et al., and incorporated by reference herein, teaches a channel bonding technique wherein a base station manages the communication on a plurality of channels. Each secondary user registers with the base station and is allocated time slots on one or more channels, based on the user's capabilities and requirements. However, channel bonding is significantly more difficult to implement on a network with distributed control, such as a home network. This difficulty is further compounded by the fact that devices may dynamically vary their bandwidths, depending upon the function being performed and/or depending upon the device or devices with which a given device is communicating. The coordination of multiple-channel assignments is further complicated in networks that span multi-hop distances, because not all devices will be in direct communication with each other.

It would be advantageous to provide a channel bonding scheme that allows devices with different bandwidth requirements to coordinate channel access in a distributed manner. It would also be advantageous to provide a channel bonding scheme that allows devices with dynamic bandwidth capabilities to efficiently communicate at varying bandwidths. It would also be advantageous to provide a channel bonding scheme that avoids inefficiencies related to quiet periods and signaling windows on multiple channels.

These advantages, and others, can be realized by a method and system wherein, in a distributed-control radio network, the timing of networks on multiple substantially independent channels are adjusted so as to establish a common time base among the networks, then concurrently transmitting data of an information item using bandwidth provided by the multiple networks. To further optimize the efficiency of this technique for cognitive radio networks, the quiet period and signaling window on each network are scheduled to provide overlapping quiet periods and/or overlapping signaling windows. Preferably, each multi-channel user is assigned the same time slot in the beacon periods of the network on each channel, thereby facilitating efficient beacon transmission and reception.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

Figure 1:
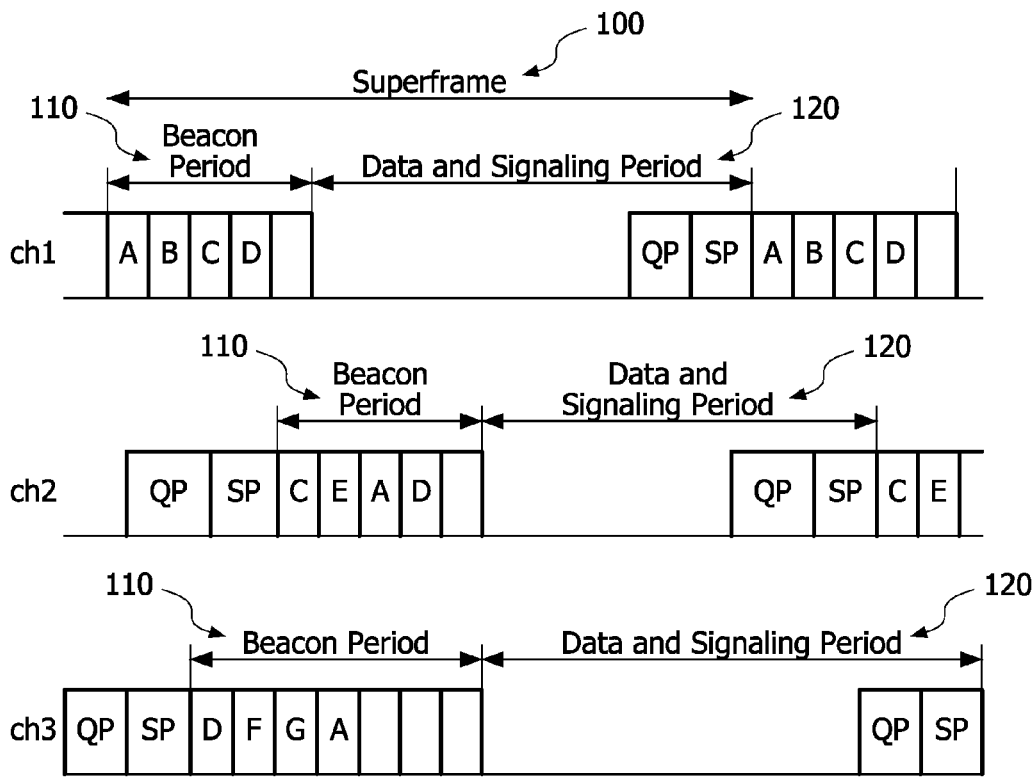
FIG. 1 illustrates examples of poor allocations of multi-channel bandwidth.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

In a distributed network, all devices are peers that operate cooperatively; in a centralized network, there is one master device and one or more slave devices. While the centralized network provides for efficient network coordination and control, it is susceptible to single-point failure, and all devices must be in range of the master. In a distributed network, a device may provide one or more reference signals for timing coordination, but each device can initiate commands/requests to other devices as the situation requires, and can provide the reference signals should the original device fail or unexpectedly leave the network.

In a preferred embodiment, the secondary-user protocol uses a superframe structure, wherein each superframe includes a plurality of time-slots. The superframe period is divided into a beaconing period (BP), a data/sense/sleep period (DSSP), and a signaling window (SW). Copending U.S. patent application 61/012,070, "A FLEXIBLE MAC SUPERFRAME STRUCTURE AND METHOD FOR SUPPORTING QoS AND SCALABILITY", filed Dec. 7, 2007 for Jianfeng Wang, Dave Cavalcanti, and Kiran Challapali, discloses such a structure for a single channel embodiment, and is incorporated by reference herein. This structure provides a unified MAC (Media Access Control) protocol that supports distributed networks as well as point-coordinated networks, and allows seamless transitions from one mode to another adaptively.

The beaconing period and signaling window are used for broadcasting or exchanging control and management information, while the data/sense/sleep period is used to exchange data from a transmitting source to one or more receiving destinations, and to periodically monitor the channel for the arrival of a primary user on the current channel during an agreed upon or mandated quiet period (QP). If a device is not scheduled to transmit or receive data, it can enter a sleep mode during the DSSP, to conserve power.

Beacons are used by devices to coordinate operations on the network, including, for example reserving transmission time in the DSSP. Master devices must provide at least one beacon, while peer devices may or may not provide a beacon, depending upon their capabilities and/or function. Slave devices rarely provide beacons. Each beaconing device acquires a time slot within the beacon period, and the synchronization among devices is maintained by establishing a common beacon period start time (BPST) and a common superframe number. The first device to initiate the network transmits its beacon at the first beacon period time slot and establishes the beacon period start time; to join the network, other beaconing devices monitor the beacon period to identify vacant beacon periods and acquires the earliest vacant beacon period by transmitting its beacon during that period.

Commands are provided to subsequently adjust the beacon period start time, request a device to change beacon period, and so on, as required, for example, to merge two networks that come in contact with each other on the same channel. Such commands are generally communicated via beacons or during the signaling window, which preferably occurs at the end of the superframe, or at the end of the beacon period. The signaling window is also used to acquire time slots in the DSSP for transmissions, for example, by non-beaconing devices.

Each transmitted beacon generally includes an identification of the device and the subnet, the device type, the superframe number, as well as information that identifies subsequent use of one or more time slots in the DSSP for transmissions to one or more intended recipients, using techniques/protocols common in the art of wireless communications. Each device in the network monitors the beacon period to determine whether it is scheduled to receive any of these transmissions.

FIG. 1 illustrates superframes 100 occurring on three channels, ch1-3. Each superframe 100 includes a beacon period 110, and a data/sense/sleep period 120. In ch1, device A provides the beacon period start time by transmitting its beacon during the first beacon period. Device A is apparently the initiator of the network, while devices B, C, and D subsequently joined the network and acquired sequential adjacent beacon periods. Ch2 is occupied by devices C, E, A, and D, with device C providing the beacon period start time; and ch3 is occupied by devices D, F, G, and A. Based on the order of acquired beacon periods, device A apparently joined the networks on ch2 and 3 after they were initiated by devices C and D, respectively.

As can be seen in FIG. 1, devices A and D are capable of spanning three channels, device C can span two channels, and devices B, E, F, and G are single channel devices. The occupancy of these multiple channels by A, C, and D, however, is substantially inefficient. In particular, the superframes on each of these channels include regularly scheduled quiet period, during which time all devices on the channel must not transmit. If a device desires the concurrent use of multiple channels, it must avoid the quiet periods on each of the multiple channels. Similarly, attempting to reserve concurrent time on channels having different beacon period start times requires a significant amount of coordination and processing overhead.

Further, if the devices are configured to communicate on multiple independent channels, each device must include a corresponding number of independent transceivers to effect these multiple independent communications, or must avoid attempting to communicate on more than one independent channel at the same time. However, current and future multi-channel devices are likely to use technologies that allow for a dynamic control of the output bandwidth of the device. That is, the data that is to be transmitted will be spread across a specified bandwidth at any given time.

The scheme of FIG. 1 substantially corresponds to a spread of the data that is to be transmitted across a given time span, and is poorly suited for spreading the data that is to be transmitted over a given frequency span (i.e. bandwidth).

Figure 2:
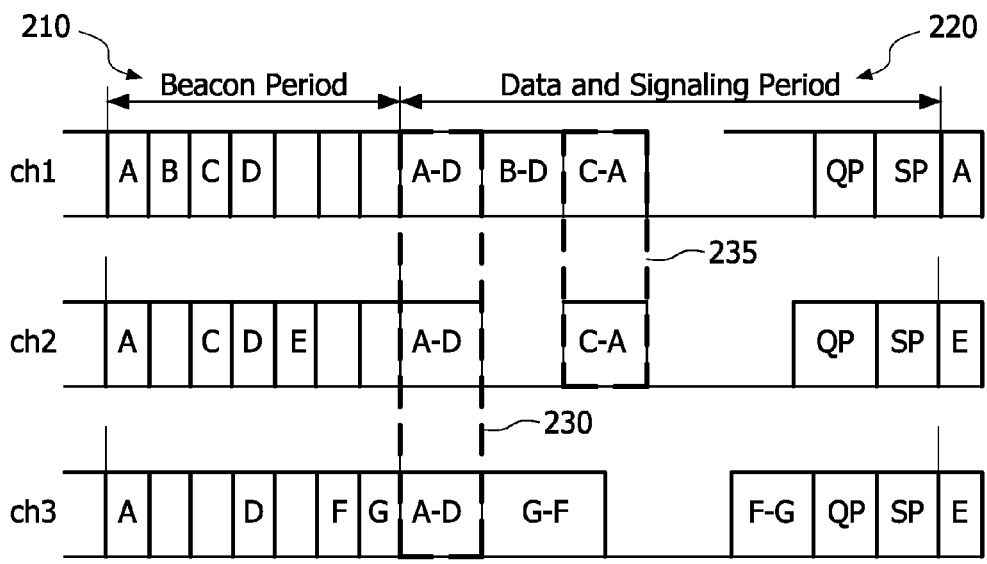
FIG. 2 illustrates an example efficient allocation of multi-channel bandwidth.

FIG. 2 illustrates a preferred synchronization of the networks across all of the channels using the techniques of this invention. Preferably, a device that desires multiple channels to be bonded, hereinafter termed a 'bonding device', adjusts the channel timing on each of the individual networks to establish a common start time for the beacon periods 210. If the channels are synchronized in time, a spread of the data that is to be transmitted over a given frequency span (bandwidth) during the data/sense/sleep period 220 can be supported, as illustrated by the example multi-channel communications between devices A and D 230 and between devices A and C 235.

In a preferred embodiment, the beacon transmission is single channel based, thereby providing compatibility among non-bonding (single-channel) devices and bonding devices. A multi-channel capable device transmits an individual beacon on each channel, for example, using OFDM-like methods. As noted above, the beacon preferably includes channel and traffic information, for example, superframe structure, beacon slot occupation information, channel reservation map, and quiet period schedule. Preferably, to allow others to know of its bonding-capability, a bonding-capable device should also indicate its capability in its beacons.

In a straightforward embodiment, a common beacon period start time can be provided on all channels by allowing a single device, such as the bonding device, to acquire the initial beacon period time slot on each channel. In the example of FIG. 2, device A acquires the initial beacon time slot on each channel by requesting the existing holders of those slots to switch. In like manner, each device that spans multiple channels, such as devices C and D, requests the appropriate time slot changes to acquire the same beacon period in each channel. The single channel devices will generally retain their current beacon time slot, unless requested to change. If the beacon period time becomes excessive, single channel devices can be requested to acquire earlier vacant time slots.

Alternatively, this same synchronization can be effected by having the bonding device request an adjustment to the beacon period start time (BPST) by the current holder of each initial beacon period time slot. In an example embodiment, the bonding device selects a reference channel, and then, via beacons or control messages in the signaling window, requests BPST alignment of each channel to this reference channel based on the differences between the BPST of the reference channel and the BPST of each other channel. Every device that receives the BPST adjustment command on each channel, including the holder of the first time slot, will adjust their timing to conform to this command.

To maintain this consistent BPST across all of the channels, if the duration of superframes on each network is adjustable, the duration of the superframes on each channel must be adjusted to a common duration, so that the 'next' beacon period on each channel occurs at the same time. Any of a variety of techniques can be used to determine a common superframe duration. In a straightforward embodiment, the bonding device can merely request/require some arbitrary duration. Alternatively, in a preferred embodiment, the bonding device assesses the current duration of the superframes on each channel, and sets the duration on superframes on each channel based on these current durations, such as a maximum current duration, an average current duration, and so on.

When multiple channels are bonded by a common time base, data from an information item being transmitted from a multi-channel device, such as data from a video stream, can be efficiently spread across the bandwidth provided by the channels, using, for example, an OFDM modulation scheme that spans the bandwidths of the bonded channels.

Having established a common beacon period start time, the bonding device preferably adjusts the quiet period of each channel individually to provide concurrent quiet periods.

Copending U.S. patent application Ser. No. 12/744,422, "DISTRIBUTED SCHEDULING OF QUIET-PERIOD FOR IN-SERVICE CHANNEL MONITORING", filed Nov. 24, 2008 for Jianfeng Wang, Kiran Challapali, and Dave Cavalcanti, discloses techniques for quiet period scheduling for single channel synchronization, and is incorporated by reference herein. In like manner, the signaling window on each channel can also be aligned.

As can be seen in FIG. 2, a major advantage of this technique is to allow bonding devices to reduce the overhead associated with beaconing, signaling and sensing. If the beacon period, quiet period, signaling window are not aligned, the overhead for beaconing, signaling and sensing could be nearly doubled, as illustrated in FIG. 1.

Figure 3:
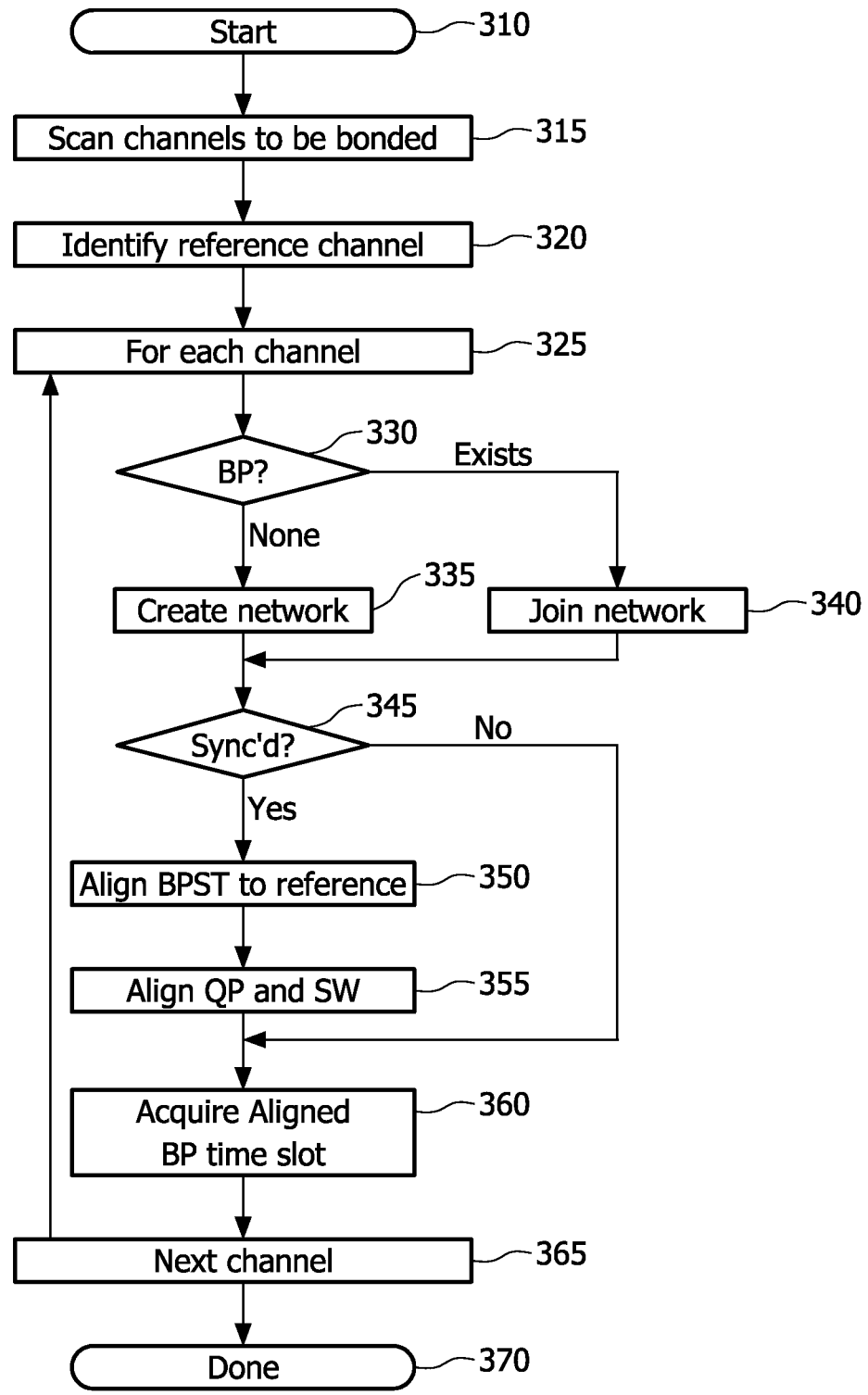
FIG. 3 illustrates an example flow diagram for achieving efficient allocation of multi-channel bandwidth.

FIG. 3 illustrates a flow diagram for synchronizing the beaconing, signaling, and sensing in a multi-channel distributed control network.

A device that desires to use, or potentially use, multiple channels starts the process at 310, and scans the channels that are to be bonded, at 315. If the device has not yet identified the potential channels, it will scan the spectrum to eliminate channels occupied by primary users, and select from the remainder. Depending upon the particular device, the selection may be limited to finding adjacent channels, although there is no inherent limitation in this process to adjacent/contiguous bandwidth for multi-channel bonding. Adjacent channel bonding is generally preferred, because typically a guard-band at each channel that is adjacent to a channel that is occupied by a primary user is required to avoid interference, whereas adjacent secondary-user channels generally do not require such guard bands.

At 320, the bonding device selects a reference channel. Any number of options are available for this selection, ranging from selecting the lowest or highest numbered channel to selecting the channel with the highest signal to noise ratio, the channel at which the bonding device already provides the initial beacon, and so on. One of skill in the art will recognize that the particular choice is relatively immaterial.

Having selected a reference channel, the bonding device interacts with the network on each channel on a single-channel basis, via the loop 325-365. In a preferred embodiment the bonding device appears as any other secondary device on each particular channel. That is, the fact that the bonding device is in the process of aligning multiple channels is substantially transparent to each other device. Although a device may deduce that another device is aligning multiple channels based on a pattern of behavior, there is nothing inherent in the preferred embodiment of this protocol that differentiates a bonding device from any other device at the individual channel level. In this manner, compatibility is assured regardless of whether the devices on a network are single or multi channel capable.

At 330, the bonding device determines whether a beacon period exists on the selected channel; if so, the bonding device joins the network at 340, producing, for example, the beacon period scheduling as illustrated for device A joining an existing network on ch2 in FIG. 1. If a beacon period is not detected, the device establishes a new network at 335 by transmitting a beacon signal to which other devices subsequently respond, as illustrated, for example, in device A's initiation of a network on ch1 in FIG. 1.

At 345, the beacon period start time (BPST) of the current channel is compared to the BPST of the reference channel, to determine whether the superframes in each channel are synchronized to each other. Typically, multiple superframes are monitored to provide a reliable determination of the actual differences between these BPSTs.

If, at 345, the bonding device determines that the current channel is not synchronized with the reference channel, the bonding device issues an 'adjust BPST' command/request that directs all of the devices on the current channel to adjust their BPST by an amount suitable for bringing the current beacon period into alignment with the reference beacon period.

Thereafter, when the bonding device determines that the BPST of the current device corresponds to the reference BPST, the bonding device begins the process of aligning the quiet period and signaling window, as required, at 355.

As noted above, copending U.S. patent application Ser. No. 12/744,422 discloses a technique for determining the requirements for regular quite periods wherein each device announces, via its beacon, its current superframe index/number and it's minimum quiet period demand, and based on this information, all devices in the network synchronize the occurrences of quiet periods so as to satisfy the maximum quiet period demand. The quiet period demand is expressed in terms of the duration of each quiet period and the interval between quiet periods. To optimize the efficiency of the multi-channel superframes relative to the quiet period demands of the network on each channel, the interval between quiet periods should be equal on all channels, or integer multiples of a smallest interval between quiet periods.

In a preferred embodiment of this invention, the bonding device assesses the determined maximum quiet period demands on each of the channels, and issues a demand that provides either a common quiet period interval on all channels, or quiet period intervals that are integer multiples of the shortest quiet period interval, so that if a quiet period is to occur, it will occur at the same superframe as any other quiet period that is scheduled to occur. That is, for example, if the shortest quiet period interval is seven superframes, the quiet period interval on each of the channels will be an integer multiple of seven, i.e. 7, 14, 21, etc. In this way, it is known that the six contiguous superframes between quiet periods will be always be free of quiet periods on all of the channels.

To assure optimal efficiency, all of the quiet periods that occur during the regularly scheduled superframes on each of the channels should be scheduled to occur during a common time interval within the superframe. For convenience, the quiet period and signaling window are preferably scheduled to occur at the end of the superframes. Optionally, they could also conveniently occur after the end of the beacon period. Generally, the signaling window is defined as a relatively fixed duration period that occurs just prior to the end of the superframe, although commands are provided to facilitate the expansion or compaction of this window.

Preferably, in order to assure such a coincidence of quiet periods across all of the channels in an embodiment with the quiet period at the end of the superframe, the end of the quiet period on each channel is adjusted to a common value, leaving the start of the quiet period on each channel determined by the required duration of the quiet period on that channel. In this manner, all of the quiet periods will overlap, while at the same time, data-transfer time periods can extend from the end of the beacon period to the start of the quiet period on each particular channel. If the protocol provides for a signaling window immediately prior to the start of each superframe, the definition of the end of the quiet period on all channels also serves to define the start of the signaling window on each of the channels.

Upon synchronizing each of the bonded channels to a common base period start time, and assuring that the quiet periods and signaling windows are coincident across all channels, the bonding device preferably acquires a common beacon period on each channel, at 360. In general, while a conventional multi-channel device is broadcasting a beacon on a channel, it is not available for monitoring beacons on this channel or any other channel. If a multi-channel device acquires the same time-slot in each beacon period, it is free to monitor beacon signals during all of the other time-slots on all of the other channels.

Each channel is similarly processed via the loop 325-365, thereby providing a common time base across all the channels. Channels that are synchronized in this manner are considered to be bonded to each other. Upon completion 370 of this bonding process, the bonding device will continue to detect and correct for any changes to the timing on any of the bonded channels. A bonding device preferably also collects channel and traffic information across bonding channels to optimize its medium access. To do that, a bonding device should listen to beacons from other devices across bonding channels periodically. A bonding device may also distribute channel and traffic information it collected to other devices for them to better utilize the channels, for example, through broadcast via its own beacons.

Even though the bonding device operates on each channel in a single-channel mode, to assure compatibility with single-channel devices, each bonding device preferably announces its presence as a bonding device on each channel, via its beacon. This allows other multi-channel devices to use the bonding provided by the bonding device, and also avoids the possibility of another bonding device arbitrarily adjusting the timing on any of the currently bonded channels.

All multi-channel devices, regardless of whether they created the bonding that is being used, should also announce their presence as a multi-channel device via their beacons. This announcement should also indicate the device's current signaling channel. Although the signaling window occurs at a scheduled time within each superframe, access to the channel during this signaling period is preferably contention based. Consequently, simultaneous communications during the signaling window of each channel would consequently require a separate transmitter/receiver for each channel, as well as suitable capabilities for reacting to these communications for each channel. By allowing for the announcement of each multi-channel device's current signaling channel via its beacon on each channel, the need for multiple simultaneous signaling resources is avoided. When a multi-channel device desires to register to use an existing bonding, the device determines the channel at which the bonding device is operating during the signaling window, and registers with the bonding device on this channel via the signaling window.

In like manner, when another multi-channel devices desires to establish multi-channel communications with a target device, it communicates its desires via the signaling window on the channel that the target device announces as its signaling channel. Note that although these devices recognize and signal each other as multi-channel devices, the network interactions required to effect their communication are performed individually on each channel. For example, in a reservation-based system, if A and C want to reserve channels for channel-bonding communication, they preferably perform channel reservation on each local channel through beacons or control messages. This assures that all devices, regardless of whether they are multi-channel capable or not, are continuously aware of local channel status. If channel access is contention based, a bonding device preferably announces its operating mode, either bonding mode or non-bonding mode, intended for use in identified time-slots, generally via its beacon. Other devices subsequently use the same operating mode to communicate with the device.

Figure 4:
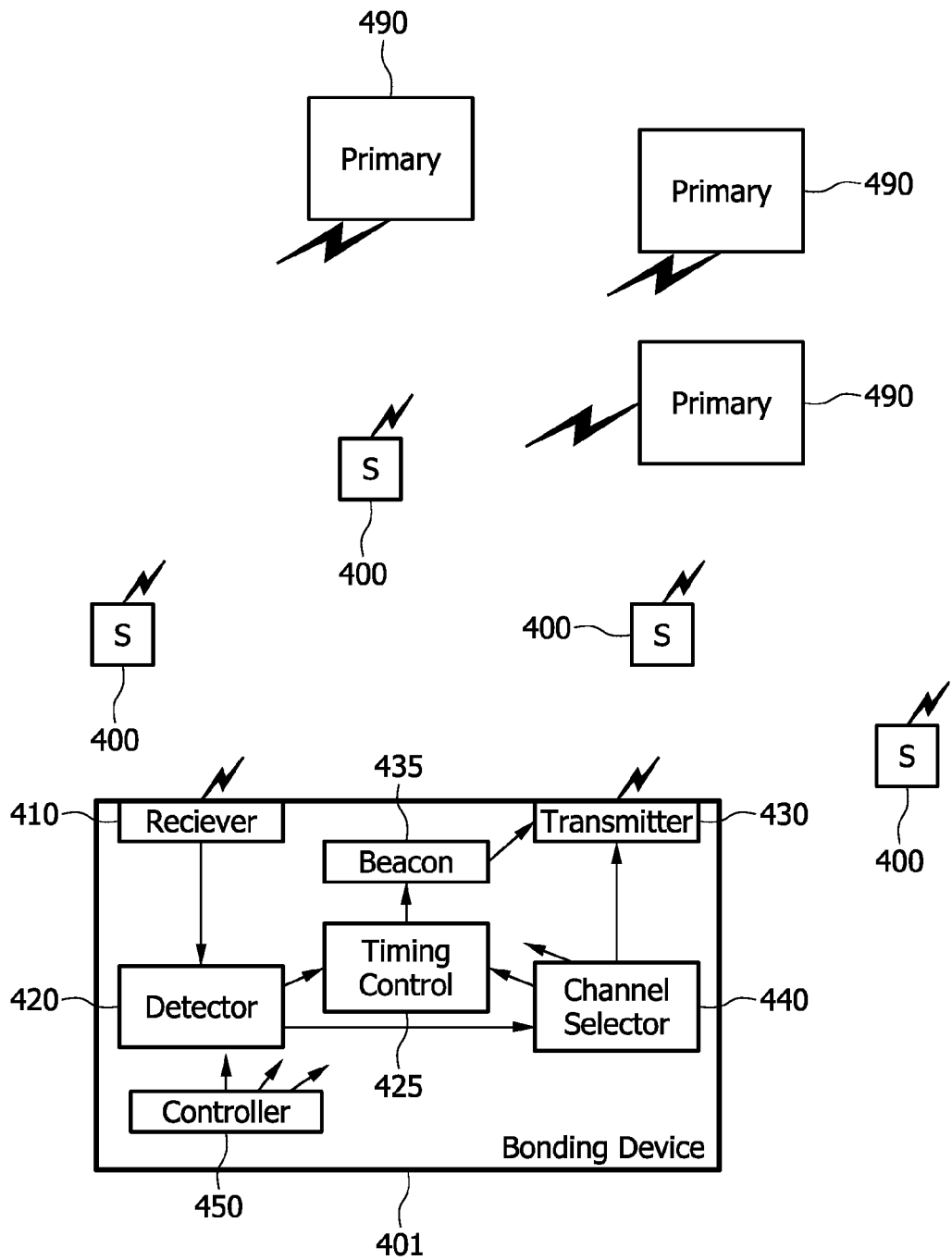
FIG. 4 illustrates an example block diagram of a distributed cognitive network.

FIG. 4 illustrates an example block diagram of a multi-channel distributed wireless system. The environment includes a number of primary users 490 that are licensed to operate in a given frequency band, and a number of secondary users 400 that are configured to operate on any frequency band that is not currently occupied by a primary user. To support multi-channel operation, one or more of the secondary user devices may be configured as a bonding device 401, which is configured to establish a common time base among a plurality of channels.

The example bonding device 401 includes a receiver 410 and transmitter 430 that are able to communicate on each of the available channels, as determined by a channel selector 440 based on commands from a controller 450. A detector 420 detects the timing characteristics of networks on the channels, such as the start time of each beaconing period of superframes received by receiver 410. These networks are created dynamically by the secondary users 400, including the bonding device 401.

The controller 450 selects one of the received networks to be a reference network, and thereafter adjusts the timing of one or more other networks to correspond to the timing of the reference network, typically using commands that are communicated via a beacon generator 435 or other signaling device. This timing control preferably includes the synchronization of superframes at each channel, as well as adjusting overhead events, such as the scheduling of quiet periods and signaling windows in cognitive radio nets, using, for example, the flow diagram of FIG. 3, detailed above.

After establishing a common time base for a plurality of networks on different channels, one or more of the secondary users 400, including the bonding device 401, can concurrently transmit data of an information item using the bandwidth provided by the plurality of networks.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented in the context of distributed networks on cognitive radio channels, one of skill in the art will recognize that the principles presented herein are not limited to cognitive radio networks or channels, and are applicable for enabling dynamic bandwidth devices to cooperatively operate across multiple channels that are configured primarily for single-channel operations. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method of bonding channels to facilitate multi-channel communications in a distributed network, comprising:
   selecting a reference channel from a plurality of available channels;
   determining a reference time of communication of a first network on the reference channel;
   selecting a second channel from the plurality of available channels;
   determining a second time of communication of a second network on the second channel corresponding to the communication on the first network;
   adjusting communications on the second network to minimize a difference between the second time and the reference time;
   acquiring a common time period from the first and second networks; and
   concurrently transmitting data of an information item using bandwidth provided by both the first and second networks during the common time period.

2. The method of claim 1, wherein the communication on the first and second networks includes superframes that each includes a beacon period, and the reference time corresponds to a start time of the beacon period.

3. The method of claim 2, wherein the superframes include periodic quiet periods, and the method includes adjusting a time of occurrence of the quiet period on at least one of the first and second networks so that the quiet periods of the first and second networks substantially coincide.

4. The method of claim 3, wherein the superframes include signaling windows, and the method includes adjusting a time of occurrence of the signaling window on at least one of the first and second networks so that the signaling windows of the first and second networks substantially coincide.

5. The method of claim 4, including announcing a channel at which a device is currently monitoring the signaling window via a beacon of the device.

6. The method of claim 2, wherein the superframes include signaling windows, and the method includes adjusting a time of occurrence of the signaling window on at least one of the first and second networks so that the signaling windows of the first and second networks substantially coincide.

7. The method of claim 6, including announcing a channel at which a device is currently monitoring the signaling window via a beacon of the device.

8. The method of claim 2, wherein each device on each network acquires a beacon time slot in the beacon period, and the method includes directing one or more devices to acquire a different beacon period to allow at least one device to acquire a same beacon time slot in the first and second network.

9. The method of claim 1, including initiating at least one of the first and second networks.

10. The method of claim 1, wherein the first and second networks are secondary user networks of cognitive radios within a spectrum of channels that include licensed primary users.

11. A bonding device comprising:
   a receiver and transmitter that are configured to operate on a plurality of channels;
   a timing controller that is configured to:
      determine a reference time of communication of a first network on a reference channel of the plurality of channels;
      determine a second time of communication of a second network on a second channel corresponding to the communication on the first network; and adjust communications on the second network to minimize a difference between the second time and the reference time; and acquire a common time period from the first and second networks;

wherein the transmitter is configured to concurrently transmit data of an information item using bandwidth provided by both the first and second networks during the common time period.

12. The device of claim 11, wherein the communication on the first and second networks includes superframes that each includes a beacon period, and the reference time corresponds to a start time of the beacon period.

13. The device of claim 12, wherein the superframes include periodic quiet periods, and the timing controller is configured to adjust a time of occurrence of the quiet period on at least one of the first and second networks so that the quiet periods of the first and second networks substantially coincide.

14. The device of claim 13, wherein the superframes include signaling windows, and the timing controller is configured to adjust a time of occurrence of the signaling window on at least one of the first and second networks so that the signaling windows of the first and second networks substantially coincide.

15. The device of claim 14, including a beacon generator that is configured to provide a beacon to the transmitter that announces a channel at which the device is currently monitoring the signaling window.

16. The device of claim 12, wherein the superframes include signaling windows, and the timing controller is configured to adjust a time of occurrence of the signaling window on at least one of the first and second networks so that the signaling windows of the first and second networks substantially coincide.

17. The device of claim 16, including a beacon generator that is configured to provide a beacon to the transmitter that announces a channel at which the device is currently monitoring the signaling window.

18. The device of claim 12, wherein each other device on each network acquires a beacon time slot in the beacon period, and the timing controller is configured to direct one or more of the other devices to acquire a different beacon period to allow the device to acquire a same beacon time slot in the first and second network.

19. The device of claim 11, including a controller that is configured to initiate at least one of the first and second networks.

20. The device of claim 11, wherein the device is a cognitive radio, and the first and second networks are secondary user networks within a spectrum of channels that include licensed primary users.

* * * * *